United States Patent Office 3,346,559
Patented Oct. 10, 1967

3,346,559
ALKYLAMINO-ALKYL-(RUTIN OR HESPERIDIN)-3,4 - DIHYDRO - 1,2,4 - BENZOTHIADIAZINE-1,1 - DIOXIDES AND METHOD FOR MAKING THE SAME
Josef Klosa, Berlin, Germany, assignor to Dr. med. Hans Voigt, Chem. Pharm. Fabrik, Berlin-Waidmannsust, Germany
No Drawing. Filed Dec. 28, 1965, Ser. No. 517,116
7 Claims. (Cl. 260—210)

ABSTRACT OF THE DISCLOSURE

Alkylamino-alkyl substituted rutin or hesperidin 3,4-dihydro-1,2,4-benzothiadiazine 1,1-dioxides are prepared by the reaction of an m,p-disubstituted o-sulfonamidoaniline with an aldehyde and an amine and with either rutin or hesperidin to form soluble compounds which are useful in therapy as diuretics and for prophylaxis against edema.

---

The present invention relates to novel alkylamino-alkyl substituted rutin or hesperidin 3,4-dihydro-1,2,4-benzothiadiazine 1,1-dioxides, and to a method for their preparation.

The novel rutin and hesperidin derivatives of the invention possess the general formula:

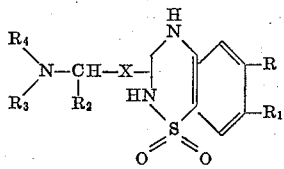

wherein X is a molecule selected from the group consisting of rutin and hesperidin, R is a member selected from the group consisting of H, halogen, lower alkyl, and halo-lower alkyl; $R_1$ is a member selected from the group consisting of H, halogen, and sulfonamido; $R_2$ is a member selected from the group consisting of H, alkyl containing from 1 to 6 carbon atoms, cycloalkyl, phenyl, and aralkyl; $R_3$ and $R_4$ are members selected from the group consisting of H, alkyl containing from 1 to 5 carbon atoms, cycloalkyl, and aralkyl, and a closed heterocyclic nitrogen ring structure formed by $R_3$ and $R_4$ selected from the group consisting of piperidine, morpholine and pyrrolidine.

In the foregoing formula, rutin is defined as the molecule of 3,3',4',5,7-pentahydroxyflavine - 3 - rutinoside, while hesperidin is defined as hesperetin 7-rhamnoglucoside or hesperetin 7-rutinoside.

Lower alkyl includes methyl, ethyl, propyl, isopropyl, butyl, isobutyl, amyl and hexyl. Halo-lower-alkyl includes alkyl of 1 to 6 carbon atoms substituted by one or more chlorine, bromine and fluorine atoms, as for example, trifluoromethyl. Where the term alkyl is employed, it is to be understood as including both normal and branched chain structures.

Aralkyl is exemplified by benzyl, while cycloalkyl is exemplified by cyclopentyl and cyclohexyl. Halogen includes chlorine, bromine and fluorine.

The positions of attachment of the alkylaminoalkyl and benzothiadiazine structures to the rutin or hesperidin molecule have not as yet been established.

The novel rutin and hesperidin derivatives of the invention are prepared by the reaction of (a) an o-sulfonamido-aniline of the formula:

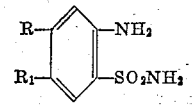

wherein R and $R_1$ have the meanings previously designated, with (b) an aldehyde of the formula:

wherein $R_2$ has the meaning previously designated, and with (c) an amine of the formula:

wherein $R_3$ and $R_4$ have the meanings previously designated, so that the amine can be a primary or secondary amine; and with (d) rutin or hesperidin.

In the foregoing reaction, the formation of a salt does not appear to be involved, since the basicity of the combination $R_3R_4$—N—$CH(R_2)$-rutin (or hesperidin) is much too small to bind the 3,4-dihydro-1,2,4-benzothiadiazine-1,1-dioxide ring, which is also only weakly acidic, in the manner of a salt. On the other hand, it would be expected that the acidic portion, namely the dihydrobenzothiadiazinedioxide ring, should be precipitated by the addition of acid, or that the basic portion $R_3R_4$—N—$CH(R_2)$-rutin (or hesperidin), would be precipitated by the addition of alkali, but this is not the case. Only when boiling for at least 30 minutes in the presence of hydrochloric acid, the grouping dihydrobenzothiadiazinedioxide can be obtained. Thus, for example, by boiling for 30 minutes 15 g. diethylamino-methyl-rutin (or hesperidin)-6-chloro-7-sulfamyl-3,4 - dihydro - 1,2,4-benzothiadiazine-1,1-dioxide in 50 ml. water and 10 ml. concentrated hydrochloric acid, there are obtained 3 g. 6-chloro-7-sulfonamido-3,4-dihydro - 1,2,4 - benzothiadiazine-1,1-dioxide.

Likewise indicating that there is no customary salt formation involved is the fact that diethylamino-methyl-rutin (or hesperidin)-6-chloro-7-sulfamyl - 3,4 - dihydro-1,2,4-benzothiadiazine-1,1-dioxide is extraordinarily well soluble in water (6 g. are completely dissolved in 10 ml. cold water at normal temperature), and so are analogous compounds; rather, a type of complex formation between the dihydrobenzothiadiazinedioxide and the $R_3R_4$—N—$CH(R_2)$-rutin (or hesperidin) groups seems to occur. An esesntial participant in this complex formation seems to be the sugar portion of the rutin or hesperidin, since a similar reaction is unsuccessful when using guercitin.

The novel compounds according to the invention thus represent a uniform class of substances. No similar manner of producing these compounds has been previously described, nor could it be foreseen according to the state of the art.

However, the following minimum molar relationships are necessary for the reaction in accordance with the invention:

| Reactant: | Moles |
|---|---|
| O-Sulfonamido-aniline | 1 |
| Aldehyde | 2 |
| Amine | 1 |
| Rutin or hesperidin | 1 |

Preferably, the molar ratio of aldehyde to o-sulfonamido-aniline is at least 2 to 1.

Advantageously, the reaction can be conducted in a solvent or a diluent. Such solvents or diluents are preferably water and lower aliphatic alcohols, such as methanol and ethanol.

Surprisingly, the novel compounds wherein $R_2$ is hydrogen or alkyl are very readily soluble in water. Thus, 100 ml. water usually are sufficient to completely dissolve 30–60 parts of the novel compounds in accordance with the invention, at normal temperature. This is surprising, insofar as the starting substances employed for the condensation step, such as o-sulfonamido-aniline and rutin or hesperidin, are very poorly soluble in water, and even insoluble in cold water. If water or a lower alcohol is used as the solvent or diluent for the reaction, the new reaction products can be precipitated first as yellow oils which soon crystallize, by the addition to the reaction solution of higher alcohols, such as propanol, butanol, preferably isopropanol, or by adding keytones, such as acetone.

For the reaction, the following o-sulfonamido-anilines are among those which can be employed: o-sulfonamido-aniline; 5-chloro-2-sulfonamido-aniline; 5-methyl-2-sulfonamido-aniline; 2,4-disulfonamido-aniline; 5-chloro-2,4-disulfonamido-aniline; 5-bromo-2,4-disulfonamido-aniline; 5-fluoro-2,4 - disulfonamido - aniline; 5 - trifluoromethyl-2,4-disulfonamido-aniline, and the like.

Suitable aldehydes include the following:
Formaldehyde, acetaldehyde, propionaldehyde, isobutyaldehyde, isoamyl aldehyde, benzaldehyde, phenylacetaldehyde, cyclopentylacetaldehyde, cyclohexylacetaldehyde, phenylpropionaldehyde, and the like.

Suitable primary and secondary amines include the following: diethylamine, dimethylamine, propylethylamine, piperdine, morpholine, pyrrolidine, and the like.

The reaction between o-sulfonamido-anilines, aldehydes, primary or secondary amines, and rutin or hesperidin can readily be conducted in solvents and diluents at normal temperature by allowing the reaction mixture to stand for a longer period of time, or it can be conducted preferably by heating up to the boiling point of the mixture. When heating the reaction mixture, the reaction is completed within 15–30 minutes.

The yields amount to as high as 90–95%.

The new alkylaminoalkyl-rutin - (or hesperidin) - 3,4-dihydro-1,2,4-benzothiadiazine-1,1-dioxides obtained according to the novel process of the invention are distinguished by valuable pharmacotherapeutic properties. Thus, these novel compounds are capable of dissolving uroliths (urinary calculi) and kidney stones, exhibit strongly diuretic properties, and are prophylactics against edemas. These novel compounds are to be employed as medicines.

The following examples illustrate the method of the invention, but are not to be regarded as limiting:

*Example 1*

132 g. aqueous crystalline rutin or hesperidin are suspended in 400 ml. methanol. 30 ml. diethylamine are introduced into this suspension, and thereafter there are added 58 g. 5-chloro-2,4-disulfonamido-aniline and thereupon 50 ml. of a 37% solution of formalin (in excess). Then the reaction mixture is heated for 30 minutes to the boiling point. A clear, yellow solution is obtained. The clear solution is allowed to cool and then mixed under stirring with 100 ml. isopropanol. A yellow-colored, thick oil is separated which soon solidifies. This oil is vacuum-filtered and washed with isopropanol.

Yield: 190 g. By concentrating the mother liquor, an additional amount of about 10 g. can be obtained so that the total yield of diethylaminomethyl-rutin (or hesperidin)-6-chloro-7-sulfonamido-3,4-dihydro - benzothiadiazine-1,1-dioxide is 200 g. The product is purified by dissolving the same in warm methanol or a small amount of water, and precipitation with isopropanol.

Melting point: Starting with 280° C., the yellow color becomes brown, then progressive decomposition is observed.

*Example 2*

13.2 g. aqueous rutin or hesperidin are suspended in about 60 ml. water. To this suspension there are added 25 ml. 30% aqueous dimethylamine solution (some excess), 6.4 g. 5-trifluoromethyl-2,4-disulfonamido-aniline, and then 5 ml. 37% aqueous formalin solution. The mixture is heated for 15 minutes to the boiling point. All components are dissolved and then the mixture is diluted with about 150 ml. isopropanol. A yellow oil precipitates which solidifies.

Yield: 20.5 g. dimethylaminomethyl-rutin (or hesperidin) - 6 - trifluoromethyl - 7 - sulfonamido - 3,4 - dihydro-1,2,4-benzothiadiazine-1,1-dioxide.

Melting point: Starting with 240° C., color change and start of decomposition occur.

*Example 3*

6.6 g. aqueous rutin or hesperidin are suspended in 30 ml. methanol. There are added to this suspension 1.5 ml. diethylamine, 2.8 g. 5-chloro-2,4-disulfonamido-aniline, and 4.5 ml. of a 50% aqueous solution of phenylacetaldehyde. The mixture is heated to the boiling point, all components being dissolved, and the solution having a brown-yellowish color. The solution is allowed to cool, mixed with isopropanol, and the orange-yellow crystalline paste is recrystallized from hot water (beautiful yellow needles).

Melting point: 192-194° C., orange coloration. Yield: 10 g. diethylamino-phenylethyl-rutin (or hesperidin)-6-chloro-7-sulfonamido-3-benzyl-3,4-dihydro-1,2,4 - benzothiadiazine-1,1-dioxide of the following formula:

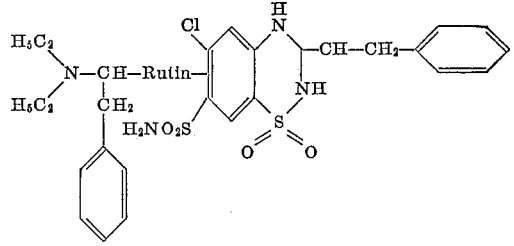

Analogously, there are obtained (1) from rutin or hesperidin, piperidine, acetaldehyde, and o-sulfonamide-aniline: piperidino-ethyl-rutin (or hesperidin)-3,4-dihydro-1,2,4-benzothiadiazine - 1,1 - dioxide, M.P. 260° C., with decomposition.

Formula:

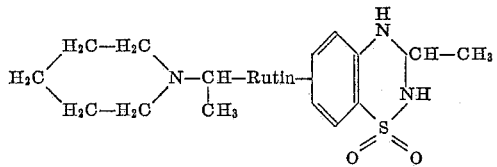

(2) from: rutin, isoamylaldehyde, dipropylamine, and 5-bromo-2,4-disulfonamido-aniline: dipropylamino - isopentyl - rutin - 6 - chloro - 3 - isobutyl 3,4-dihydro-1,2,4-benzothiadiazine-1,1-dioxide, M.P. starting with 235° C., with decomposition.

*Example 4*

132 g. aqueous, crystalline rutin are suspended in 200 ml. methanol. There are added 58 g. 5-chloro-2,4-disulfonamido-aniline. Under stirring, the suspension is mixed with 30 ml. diethylamine. Thereupon, 50 ml. of a 37% aqueous formalin solution are added in two batches, and intense stirring is carried out. The reaction is initiated with heating, and the mixture is dissolved. The stirring is continued for 3 hours, and then the mixture is slowly mixed with 100 ml. isopropanol. Thereafter, 50 ml. ether are added; the mixture is allowed to stand for 1 hour, and a yellow, sandy powder is vacuum-filtered.

Yield: about 200 g. diethylaminomethyl-rutin-6-chloro-7-sulfonamido-3,4-dihydro - 1,2,4 - benzothiadiazine-1,1-dioxide.

The compound is very readily soluble in water. The yellow substance has a bitter taste.

Example 5

13.2 g. aqueous hesperidin are suspended in 60 ml. water. There are added 5.8 g. 5-chloro-2,4-disulfonamido-aniline. Thereupon, 25 ml. of a 30% dimethylamine solution are added, and finally, under stirring, 5 ml. of a 37% aqueous formalin solution. The mixture heats up, and the suspension is converted into a solution, having an orange color. Under stirring, the reaction solution is heated for an additional period of 30–60 minutes on the water bath to 50–60° C., complete solution taking place. Thereupon, the clear solution is mixed with 150 ml. isopropanol, or also normal propyl alcohol. Yellow crystals precipitate which are vacuum-filtered and washed with ether.

Melting point: Starting with 260° C., with decomposition.

Yield: 20 g. dimethylaminomethyl-hesperidin-6-chloro-7-sulfonamido-3,4-dihydro - 1,2,4 - benzothiadiazine-1,1-dioxide.

It will be understood that the above description of the present invention is susceptible to various modifications, changes, and adaptations, and the same are intended to be comprehended within the meaning and range of equivalents of the appended claims.

What is claimed is:

1. A compound of the formula:

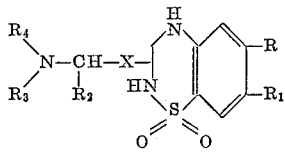

wherein X is a molecule selected from the group consisting of rutin and hesperidin, R is selected from the group consisting of H, halogen, lower alkyl, and halo-lower alkyl; $R_1$ is selected from the group consisting of H, halogen and sulfonamido; $R_2$ is selected from the group consisting of H, alkyl containing from 1 to 6 carbon atoms, cyclopentyl, cyclohexyl, phenyl, and benzyl; $R_3$ and $R_4$ are selected from the group consisting of H, alkyl containing from 1 to 5 carbon atoms, cyclopentyl, cyclohexyl and benzyl, and a closed heterocyclic nitrogen ring structure formed by $R_3$ and $R_4$ selected from the group consisting of piperidine, morpholine, and pyrrolidine.

2. Diethylaminomethyl-rutin-6-chloro-7 - sulfonamido-3,4-dihydro-1,2,4-benzothiadiazine-1,1-dioxide.

3. Dimethylaminomethyl - hesperidin - 6 - trifluoromethyl-7-sulfonamido-3,4-dihydro - 1,2,4 - benzothiadiazine-1,1-dioxide.

4. Diethylamino-phenylethyl-rutin-6 - chloro - 7 - sulfonamido-3,4-dihydro-3-benzyl - 1,2,4 - benzothiadiazine-1,1-dioxide.

5. Dimethylaminomethyl-hesperidin-6-chloro - 7 - sulfonamido-3,4-dihydro-1,2,4 - benzothiadiazine - 1,1 - dioxide.

6. Method for the preparation of alkylaminoalkyl-3,4-dihydro-1,2,4-benzothiadiazine-1,1-dioxide derivatives of rutin and hesperidin which comprises reacting in a solvent a mixture of (a) an o-sulfonamido-aniline of the formula:

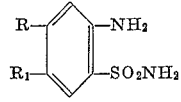

wherein R is selected from the group consisting of H, halogen, lower alkyl, and halo-lower alkyl; and $R_1$ is selected from the group consisting of H, halogen and sulfonamido;

(b) an aldehyde of the formula:

wherein $R_2$ is selected from the group consisting of H, alkyl containing from 1 to 6 carbon atoms, cycloalkyl, phenyl, and aralkyl;

(c) an amine of the formula:

wherein $R_3$ and $R_4$ are selected from the group consisting of H, alkyl containing from 1 to 5 carbon atoms, cycloalkyl, and aralkyl, and a closed heterocyclic nitrogen ring structure formed by $R_3$ and $R_4$ selected from the group consisting of piperidine, morpholine, and pyrrolidine; at a temperature between room temperature and the boiling point of said mixture.

7. The method of claim 6 in which the molar ratio of aldehyde to o-sulfonamido-aniline is at least 2 to 1.

References Cited

UNITED STATES PATENTS 2,646,428   7/1953   Chabrier et al. _____ 260—210

FOREIGN PATENTS 348,710   10/1960   Switzerland.

LEWIS GOTTS, *Primary Examiner.*

J. R. BROWN, *Assistant Examiner.*